United States Patent Office 3,510,172
Patented May 5, 1970

3,510,172
PRESSURE REGULATING VALVE FOR FLUID
PRESSURE OPERATED BRAKE SYSTEMS
Ewald Pekrul, Kappenberg, Germany, assignor to Westinghouse Bremsen- und Apparatebau G.m.b.H., Hannover, Germany
Filed Apr. 24, 1968, Ser. No. 723,689
Int. Cl. B60t 8/26
U.S. Cl. 303—6                                                        2 Claims

ABSTRACT OF THE DISCLOSURE

A pressure regulating valve for fluid pressure operated brake systems in which a differential piston subject on the smaller side to a variable control pressure in a control pressure chamber and subject on the larger side to delivered pressure in a delivery chamber operates an exhaust valve communicating the delivery chamber to atmosphere and an inlet valve communicating the control pressure chamber to the delivery pressure chamber to maintain a predetermined proportional relationship of the delivery pressure to the control pressure for low range control pressure, and including a spring-biased coaxially disposed auxiliary piston operable in response to control pressures in a higher range to mechanically couple with the differential piston to increase the effective size of the smaller end of the differential piston thereby effecting an increase in the proportional relationship of delivery pressure to control pressure in the higher control pressure range.

BACKGROUND OF INVENTION

Figure 1:
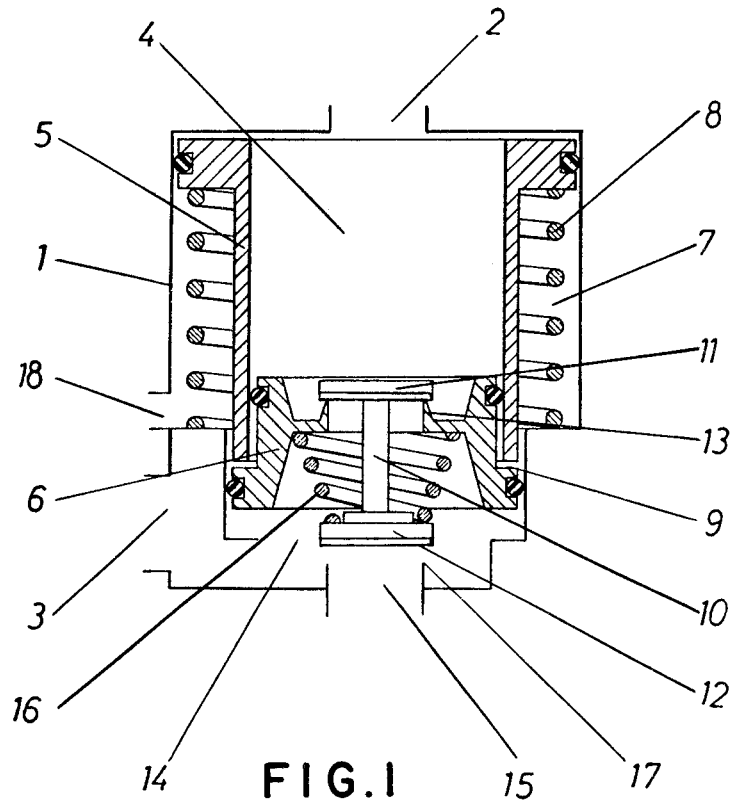

Heretofore, it has been observed that the front axle brakes of a power operated vehicle, as a consequence of inertially induced axle load displacements, transfer to the road surface a brake force which increases with increasing vehicle retardation. If such a brake arrangement is designed to provide a higher brake force, there arises the danger of wheel lock under limited vehicle retardation and accompanying limited inertially induced axle load displacement, particularly where the road surface is smooth. In brake arrangements of this type which are not designed to take into account the inertially induced axle load displacements relative to the front axle brakes, there is no provision for utilizing larger brake forces under the conditions in which larger vehicle retardations transfer the larger brake forces to the road surface through the front wheels, with the result that the desired optimum brake retardation is not achieved.

In order to obtain optimum brake forces under the conditions as above described, it has been proposed to provide brake force regulators which depend upon axle loading conditions to match the brake forces automatically to the axle load. This type of brake force regulator has been fastened to the vehicle frame and connected to the axle means by appropriate linkage so that the brake force regulator is adjusted with each change in clearance between the vehicle frame and the axle in correspondence to the axle load. However, since the space between the vehicle axle and the vehicle rigging is limited, this type of brake force regulator is seldom used because of the difficulties of installation. Therefore, in this type of brake force regulator, the brake force is regulated only on the rear wheel, or, alternatively, a proportional valve device is disposed ahead of the brake cylinders on the front axle, which front axle brake cylniders are operated by the pressure delivered from the brake force regulator in accordance with the amount of loading on the rear axle. The proportional valve device thus controlled operates to reduce the brake force delivered from the brake valve in correspondence with the proportional distribution of the static axle load, as controlled by the load on the rear axle. In this type of brake arrangement, any inertially induced change in the front axle load is ignored, and further, the balancing of the braking force on the rear axle that occurs as a result of the increasing vehicle retardation and the inertially induced axle load displacement leads to the reduction in the brake forces on the highly loaded front wheels.

It has also been proposed on air sprung vehicles to provide brake force regulators which control pressure to the brake cylinders in correspondence with the axle loading of the vehicle. However, this type of brake force regulator is limited to use with power operated vehicles having air springs.

SUMMARY

It is the object of the present invention to provide a pressure regulator of simple construction, which provides greater retardation of the front wheels of a power operated vehicle in correspondence with inertially induced axle load displacement occurring in a higher range of vehicle retardation, and provides for a proportionally smaller braking pressure in the lower range of vehicle retardation.

In the present invention this object is achieved by providing an auxiliary piston spring-loaded in opposition to control pressure, and operable in response to control pressures in a predetermined higher range, to be power coupled in an additive manner with the smaller end of a differential piston so that the combined areas of the smaller end of the differential piston and the auxiliary piston cooperate in response to high range control pressures to provide delivery pressures proportionally higher relative to control pressures in the higher range than the proportion between delivey pressure and control pressure in the low range control pressures. The differential piston is disposed coaxially relative to the auxiliary piston and is guided in a sealed manner at its upper end within the regulator housing, and a spring-loaded double valve body comprising an inlet valve and an exhaust valve is coaxially disposed on the differential piston.

Figure 2:
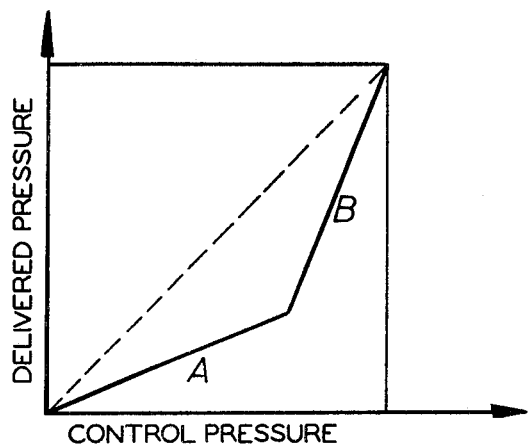

This and other objects of the device will become more readily apparent in the following description, taken with the drawing, in which:

FIG. 1 is a cross-sectional view of the pressure regulator showing my invention; and FIG. 2 comprises a graphical illustration of the change in delivered pressure relative to the change in control pressure.

Referring now to the drawing, and particularly to FIG. 1 thereof, there is shown a pressure regulator which may be utilized to regulate the brake force to the front wheel brakes of a power operated vehicle, and comprising a cylinder housing or body 1 connected by means of inlet 2 with a brake valve, not shown, of a power operated vehicle, not shown. By means of the delivery port 3 the pressure regulator is connected to the brake cylinders, not shown, of the front axle of the power operated vehicle. The control pressure chamber 4, subject to pressurization by way of inlet port 2, is disposed within a hollow cylindrically-shaped auxiliary piston 5 which is axially movable in, and sealingly disposed relative to, the regulator housing 1. A differential piston 6 is disposed coaxially with the auxiliary piston 5 and partially within the lower end thereof. The differential piston 6 is disposed for movement in a sealed manner in the auxiliary piston 5 and in the housing 1. In chamber 7 beneath the auxiliary piston 5 there is disposed a spring 8 compressible between the housing 1 and the auxiliary piston 5. The differential piston 6 includes thereon a lateral projection 9 axially engageable by the lower end of the auxiliary piston 5. Inside the differential piston 6 there is coaxially disposed there-with a double valve body 10 having an inlet disc valve 11 on the upper end thereof and an outlet or exhaust valve 12 on the lower end thereof. In the position of the double valve body 10 as shown in FIG. 1 of the drawing, the inlet valve 11 is seated on the inlet valve seat 13 of the differential piston 6, thereby sealing off the communication between the control pressure chamber 4 above the smaller end of the differential piston 6 and the delivery chamber 14 disposed beneath the larger end of the differential piston 6. The delivery port 3 of the pressure regulator may be connected in any suitable manner to the brake cylinders, not shown, of the front axle, which delivery port 3 communicates with the delivery chamber 14. An exhaust port 15 communicates chamber 14, in the position shown, with atmosphere. The exhaust port 15 may be closed by the exhaust valve 12 which is biased downward by means of the spring 16 acting against exhaust valve seat 17. The chamber 7 beneath the auxiliary piston 5 is communicated with atmosphere by means of port 18 to eliminate dash-pot operation of auxiliary piston 5.

In now describing the operation of the pressure regulator of the present invention, it will be assumed that control pressure chamber 4 is depressurized, that valve 11 is closed, that valve 12 is open and that delivery pressure chamber 14 is also depressurized, in the manner illustrated in FIG. 1 of the drawing. Under these conditions auxiliary piston 5 is disposed in its uppermost position under the urging of spring member 8, the differential piston 6 assumes the position shown in which the exhaust opening 15 is opened, and, chamber 14 and the brake cylinders, not shown, connected to port 3, are likewise depressurized through the open exhaust valve 15.

If it is now assumed that a brake valve, not shown, pressurizes chamber 4 by way of inlet port 2, the gradual buildup in pressure will move the differential piston 6 in a downward direction until the pressure spring 16 engages the outlet valve disc 12 with the outlet valve seat 17 whereupon continued downward movement of differential piston 6 effects unseating of the inlet valve seat 13 relative to the inlet valve 11. The opening of inlet valve 11 pressurizes delivery chamber 14 beneath differential piston 6, which in turn pressurizes the brake cylinders by way of port 3. The pressure buildup in chamber 14 acts upon the differential piston 6 and, since its lower actuating surface is greater than the upper actuating surface thereof the differential piston 6 is ultimately moved upwardly until the inlet valve seat 13 relocates on the inlet valve disc 11. The pressure in the delivery chamber 14 is thereby prevented from further increasing since the connection between the chamber 4 and 14 is now closed off. The forces acting upon the opposite ends of the differential piston 6 are now balanced. The inlet valve disc 11 rests upon the inlet valve seat 13 and the exhaust valve disc 12 rests upon the exhaust valve seat 17 in a sealed manner, thereby effecting cessation of operation of the pressure regulator in accordance with the pressure established in control pressure chamber 4. It is seen that the pressure in delivery chamber 14 and the brake cylinder has been set at a value proportional to the pressure in the control pressure chamber 4, which proportion is the same as that of the actuating surface area of the differential piston on the upper side thereof relative to the actuating area of the differential piston on the lower side thereof.

Each additional increase in the control pressure in chamber 4 effects a proportional increase in the delivery chamber 14 whereby the differential piston 6 is moved in a downward direction and the inlet valve seat 13 is raised relative to the inlet valve disc 11 until the pressure in chamber 14 has increased correspondingly to the proportional surface areas on the smaller end and larger end of the differential piston. Therefore, the pressure existing in chamber 14 and in the brake cylinders on the front axle, are proportionately smaller than the control pressure in the control pressure 4 as governed by the proportional difference between the upper and lower actuating areas of the differential piston 6. In the lower braking range, the auxiliary piston 5 remains in the uppermost position due to the force of spring 8 thereon biasing the auxiliary piston 5 to the uppermost position shown so that the auxiliary piston has no effect upon the above-described operation of the pressure regulator. Therefore, the proportional relationship between the applied control pressure and the delivered pressure is constant in the lower braking range as is illustrated in FIG. 2 by leg A of the characteristic curve of operation of the pressure regulator.

In the higher brake range, that is in the higher range of control pressure in control pressure chamber 4, a force is developed upon the upper end of the auxiliary piston 5 so as to move it against the bias of spring 8 in a downward direction until the lower end of auxiliary piston 5 engages lateral projection 9 of the differential piston 6. At this point, the pistons 5 and 6 are power coupled one to the other. As a consequence of additional increase in the control pressure in control pressure chamber 4 auxiliary piston 5 and differential piston 6 move together in a downward direction under the force applied to the upper end of differential piston 6 and the upper end of the auxiliary piston 5 cooperating in an additive manner to thereby move valve seat 13 downward to unseat relative to inlet valve 11 to correspondingly pressurize delivery chamber 14 beneath the differential piston 6. Before piston 5 contacts the projection 9 of the differential piston 6, the force developed by the control pressure on the actuating surface of the auxiliary piston 5 and the force of the spring 8 are in a balanced condition. However, under the conditions now to be described, when the auxiliary piston engages the projection 9 the auxiliary piston is moved against the force of spring 8 with increasing control pressure in chamber 4. This force difference effects downward movement of the differential piston 6 so that any balanced condition which occurs in chamber 14 must now oppose not only the actuating surface of the upper end of the differential piston 6 but also the supplementary force applied thereto by auxiliary piston 5. The close-off position of the pressure regulator then first occurs when the pressure in chamber 14 beneath the differential piston 6 is increased by an amount sufficient to balance the force applied by both the auxiliary piston 5 and the upper end of differential piston 6, the force difference on the auxiliary piston 5 effected by each increase in control pressure becoming greater since the force of the pressure spring 8 is approximately constant, so that the pressure in the brake cylinders rises in the chamber 14 sharply in proportion to the applied control pressure. The proportion of the pressure in delivery pressure chamber 14 relative to the control pressure in control pressure chamber 4 is now larger than that in the lower control pressure range. Therefore, in the upper brake force range, the characteristic curve illustrated in FIG. 2 continues along leg B on a steeper rising portion illustrating the greater increase in delivery pressure for any given increase in control pressure in the higher range.

With the application of full braking control pressure in control pressure chamber 4, such control pressure becomes so high that the differential piston 6 and the auxiliary piston 5 are moved downwardly to such an extent that the inlet valve seat no longer can engage the inlet valve member 11. As a consequence, the pressure in chamber 14 now increases at the same value as the pressure in control chamber 4 to thereby apply the full control pressure to the delivery chamber 14 and the brake cylinders. Under these conditions, the proportion between the controlled supplied pressure and the delivery pressure is 1:1.

In order to terminate a braking operation, the chamber 4 above the brake valve is exhausted. As a result, the auxiliary piston 5 is moved upwardly under the urging of biasing spring 8 and the differential piston 6 is likewise moved upwardly under the urging of pressure in chamber 14 so that the exhaust valve disc 12 is unseated relative to the exhaust valve seat 17. The pressure existing in delivery chamber 14 and in the brake cylinder now escapes through the exhaust opening 15 to atmosphere.

From the foregoing it is seen that the construction of the present regulator is quite simple and inexpensive, and with the installation thereof in brake piping of a vehicle to control the brake cylinders at the front axle thereof there is the additional advantage that the brake cylinder utilizes dynamic axle loading displacement to provide stronger braking retardations on the front axle wheels in such fashion that locking of the front wheels is prevented in the low range brake force applications. In this low range of brake force retardation, the brake force on the front wheels rises, as illustrated in FIG. 2 of the drawing, on the flat leg portion A of the characteristic curve. However, within the range of greater retardation, the characteristic curve continues at a sharp angle onto the steeper leg B of the characteristic curve and rises rapidly in correspondence to the increased brake force on the front wheels. It is seen, then, the utilization of the present invention provides for optimum brake retardation on a power operated vehicle. Moreover, it is seen that the present invention may disregard the load condition of the vehicle since the load proportion between the empty and load condition on the front axle is much smaller than that on the rear axle and the inertially induced axle load displacement governing the operation of the present device is a much stronger force determining the behavior of a vehicle under braking force. Further, in accordance with the present invention, the pressure regulator can be disposed in any one of a number of variety of locations in the brake piping between the brake valve and the brake cylinders wherever sufficient space is available, thus facilitating accessibility for maintenance purposes.

The present pressure regulator is not restricted to use in brake arrangements as such, but, for example, may be used for start control of power machines or generators where it is desired to have a first straight line characteristic curve in response to increase in control pressure and which is subject to change to a sharply rising curve in response to larger control pressure.

Having now described the invention, what I claim as new and desire to secure by Letters Patent, is:

1. A fluid pressure regulator, comprising:
   (a) a cylinder body;
   (b) means including a differential piston in said cylinder body operable to provide in a delivery chamber on the larger end of the differential piston a delivery pressure relating to control pressure in a control pressure chamber on the smaller end of the differential piston in a first proportion for low range control pressures;
   (c) means including auxiliary piston means operable to effectively enlarge the smaller end of the differential piston only in a range of control pressure higher than said low range to provide in said delivery chamber a pressure having a higher proportion to the control pressure in the higher control pressure range than in the low range of control pressure; and
   (d) said means including a differential piston comprising:
      (i) first port means communicating said delivery chamber with atmosphere;
      (ii) second port means communicating said control pressure chamber to said delivery chamber; and
      (iii) valve means operable in a first mode to open said second port means and close said first port means in response to movement of said differential piston in response to preponderance of force on said smaller end over the force on said larger end, and operable in a second mode to close said second port means in response to movement of said differential piston when the force on said larger end equals the force on said smaller end, and operable to open said first port means in response to preponderance of force in said delivery chamber on said larger end of said differential piston over the force in said control pressure chamber on said smaller end of said differential piston.

2. A fluid pressure regulator as recited in claim 1, in which:
   (a) said second port means is disposed coaxially through said differential piston;
   (b) said first port means is coaxially disposed with said second port means;
   (c) said valve means comprises a pair of valve members coaxially disposed on opposite ends of a connector, one of said pair of valve members seatable on said second port means and the other of said pair of said valve members seatable on said first port means.

References Cited

UNITED STATES PATENTS

| | | | |
|---|---|---|---|
| 2,408,513 | 10/1946 | Gunderson | 303—6 |
| 2,818,138 | 12/1957 | Ostwald et al. | 188—152 X |
| 2,876,625 | 3/1959 | Schnell | 188—152 X |
| 3,339,579 | 9/1967 | Lewis et al. | |

FERGUS S. MIDDLETON, Primary Examiner

J. J. McLAUGHLIN, Jr., Assistant Examiner

U.S. Cl. X.R.

60—54.5; 137—102, 508; 188—152